US012591603B2

(12) United States Patent
Ray et al.

(10) Patent No.: US 12,591,603 B2
(45) Date of Patent: Mar. 31, 2026

(54) AUTOMATED KEY-VALUE EXTRACTION USING NATURAL LANGUAGE INTENTS

(71) Applicant: ASAPP, INC., New York, NY (US)

(72) Inventors: Soham Ray, Ithaca, NY (US); Volkan Cirik, London (GB); Kilian Quirin Weinberger, Ithaca, NY (US); Satchuthananthavale Rasiah Kuhan Branavan, London (GB); Paloma Sodhi, Ithaca, NY (US)

(73) Assignee: ASAPP, INC., New York, NY (US)

( * ) Notice: Subject to any disclaimer, the term of this patent is extended or adjusted under 35 U.S.C. 154(b) by 474 days.

(21) Appl. No.: 18/078,740

(22) Filed: Dec. 9, 2022

(65) Prior Publication Data

US 2024/0193190 A1 Jun. 13, 2024

(51) Int. Cl.
| | |
|---|---|
| *G06F 16/3329* | (2025.01) |
| *G06F 40/30* | (2020.01) |
| *G06F 40/40* | (2020.01) |

(52) U.S. Cl.
CPC .......... *G06F 16/3329* (2019.01); *G06F 40/30* (2020.01); *G06F 40/40* (2020.01)

(58) Field of Classification Search
CPC .... G06F 40/30; G06F 40/284; G06F 16/3329; G06F 40/35; G06F 40/40; G06F 3/04883; G06F 3/04886; G06F 3/0482; G06F 16/955; G06F 3/0481; G06F 3/0486; G06F 9/451; G06F 2203/04803; G06F 3/04817; G06F 3/0484; G06F 3/04895; G06F 3/0416; G06F 3/0488; G06F 3/14; G06F 2111/02; G06F 2111/04; G06F 30/00; G06F 30/17; G06F 11/3438; G06F 16/243; G06F 16/334; G06F 16/338; G06F 16/40; G06F 16/634; G06F 16/68; G06F 16/683; G06F 16/90332; G06F 16/9535; G06F 21/31; G06F 21/34; G06F 21/41; G06F 21/6209; G06F 3/002;
(Continued)

(56) References Cited

U.S. PATENT DOCUMENTS

| | | | | |
|---|---|---|---|---|
| 12,131,137 | B2 * | 10/2024 | Geva | ........................ G06F 8/38 |
| 2018/0012232 | A1 * | 1/2018 | Sehrawat | ................ G06F 21/31 |

(Continued)

OTHER PUBLICATIONS

"Token classification", Hugging Face, Hugging Face Course Chapter 7/2 https://huggingface.co/course/chapter7/2 (accessed on Feb. 2, 2023), 27 pages.
(Continued)

*Primary Examiner* — Abdelali Serrou
(74) *Attorney, Agent, or Firm* — GTC Law Group PC & Affiliates

(57) ABSTRACT

The extraction of key values from a conversation may be facilitated by using automation techniques. Communications of a conversation may be processed to determine a natural language intent, and the intent may be used to determine one or more target keys. The automated process may be used to obtain values for the one or more target keys. For a target key, a prompt may be presented to a user in the conversation, a response may be received from the user, and the response may be processed with a value extractor corresponding to the target key to determine a value for the target key. The values may then be presented to user in the conversation or used for other processing.

23 Claims, 7 Drawing Sheets

(58) Field of Classification Search

CPC ........ G06F 3/0483; G06F 9/453; G06F 9/546; G06F 21/16; G06F 21/36; G06F 21/46; G06F 21/608; G06F 21/629; G06F 2221/2107; G06F 2221/2119; G06F 3/048; G06F 3/0485; G06F 3/04855; G06F 8/24; G06F 8/38; G06F 40/205; G06F 40/268; G06F 16/9024; G06F 40/216; G06F 40/289; G06F 16/3325; G06F 40/20; G06F 40/56; G06F 16/33; G06F 16/332; G06F 16/3344; G06F 3/04842; G06F 40/263; G06F 16/24522; G06F 18/2178; G06F 3/167; G06F 40/137; G06F 40/169; G06F 40/211; G06F 40/253; G06F 40/279; G06F 40/295; G06F 40/58; G06F 16/248; G06F 16/285; G06F 16/3337; G06F 16/35; G06F 18/214; G06F 18/22; G06F 40/126; G06F 40/166; G06F 40/186; G06F 40/274; G06F 40/44; G06F 40/47; G10L 15/22; G10L 15/183; G10L 15/1822; G10L 15/1815; G10L 15/19; G10L 15/16; G10L 15/26; G10L 15/063; G10L 15/30; G10L 15/18; G10L 2015/223; G10L 25/51; G10L 25/63; G10L 25/66; G10L 15/01; G10L 15/197; G10L 2015/081; G10L 25/87; G10L 2015/0638; G10L 2015/228; G10L 21/10; G10L 13/027

See application file for complete search history.

(56) References Cited

U.S. PATENT DOCUMENTS

| | | | |
|---|---|---|---|
| 2018/0174037 A1* | 6/2018 | Henry | G06F 16/335 |
| 2018/0253734 A1* | 9/2018 | Henry | G06Q 30/0631 |
| 2019/0138190 A1* | 5/2019 | Beaver | G06F 40/35 |
| 2019/0227822 A1* | 7/2019 | Azmoon | G06F 40/186 |
| 2019/0253426 A1* | 8/2019 | Morrison | G06F 16/9535 |
| 2020/0234694 A1* | 7/2020 | Griffiths | G10L 15/144 |

OTHER PUBLICATIONS

"What is Question Answering?", Hugging Face, https://huggingface.co/tasks/question-answering (accessed Feb. 2, 2023), 3 pages.

Devlin, Jacob , et al., "BERT: Pre-training of Deep Bidirectional Transformers for Language Understanding", CoRR arXiv:1810.04805v2 [cs.CL], https://arxiv.org/pdf/1810.04805.pdf (accessed on Mar. 21, 2020), May 24, 2019, 16 pages.

Lee, Chia-Hsuan , et al., "Dialogue State Tracking with a Language Model using Schema-Driven Prompting", arXiv:2109.07506v1 [cs.CL], https://arxiv.org/abs/2109.07506 (accessed Jan. 31, 2023), Sep. 15, 2021, 13 pages.

Lin, Zhaojiang , et al., "Leveraging Slot Descriptions for Zero-Shot Cross-Domain Dialogue State Tracking", Proceedings of the 2021 Conference of the North American Chapter of the Association for Computational Linguistics: Human Language Technologies, https://www.aclweb.org/anthology/2021.naacl-main.448.pdf, Jun. 6-11, 2021, pp. 5640-5648.

Mccormick, Chris , "Question Answering with a Fine-Tuned BERT", https://mccormickml.com/2020/03/10/question-answering-with-a-fine-tuned-BERT/ (accessed Feb. 2, 2023), 2020, 32 pages.

Van Aken, Betty , et al., "How Does BERT Answer Questions? A Layer-Wise Analysis of Transformer Representations", arXiv: 1909.04925v1 [cs.CL], https://arxiv.org/pdf/1909.04925.pdf (accessed Jan. 31, 2023), Sep. 11, 2019, 10 pages.

Wu, Chien-Sheng , et al., "TOD-BERT: Pre-trained Natural Language Understanding for Task-Oriented Dialogue", arXiv:2004.06871v3 [cs.CL], https://arxiv.org/abs/2004.06871 (accessed on Jan. 31, 2023), Oct. 1, 2020, 13 pages.

Yadav, Vikas , et al., "A Survey on Recent Advances in Named Entity Recognition from Deep Learning models", In Proceedings of the 27th International Conference on Computational Linguistics, pp. 2145-2158, Santa Fe, New Mexico, USA. Association for Computational Linguistics., https://aclanthology.org/C18-1182/, Aug. 20-26, 2018, pp. 2145-2158.

Yadav, Vikas , et al., "A Survey on Recent Advances in Named Entity Recognition from Deep Learning models", arXiv:1910.11470v1 [cs.CL], https://arxiv.org/pdf/1910.11470.pdf (accessed on Jan. 31, 2023), Oct. 25, 2019, 14 pages.

Zhu, Fengbin , et al., "Retrieving and Reading : A Comprehensive Survey on Open-domain Question Answering", arXiv:2101.00774v3 [cs.AI], https://arxiv.org/pdf/2101.00774.pdf (accessed on Jan. 31, 2023), May 8, 2021, 21 pages.

* cited by examiner

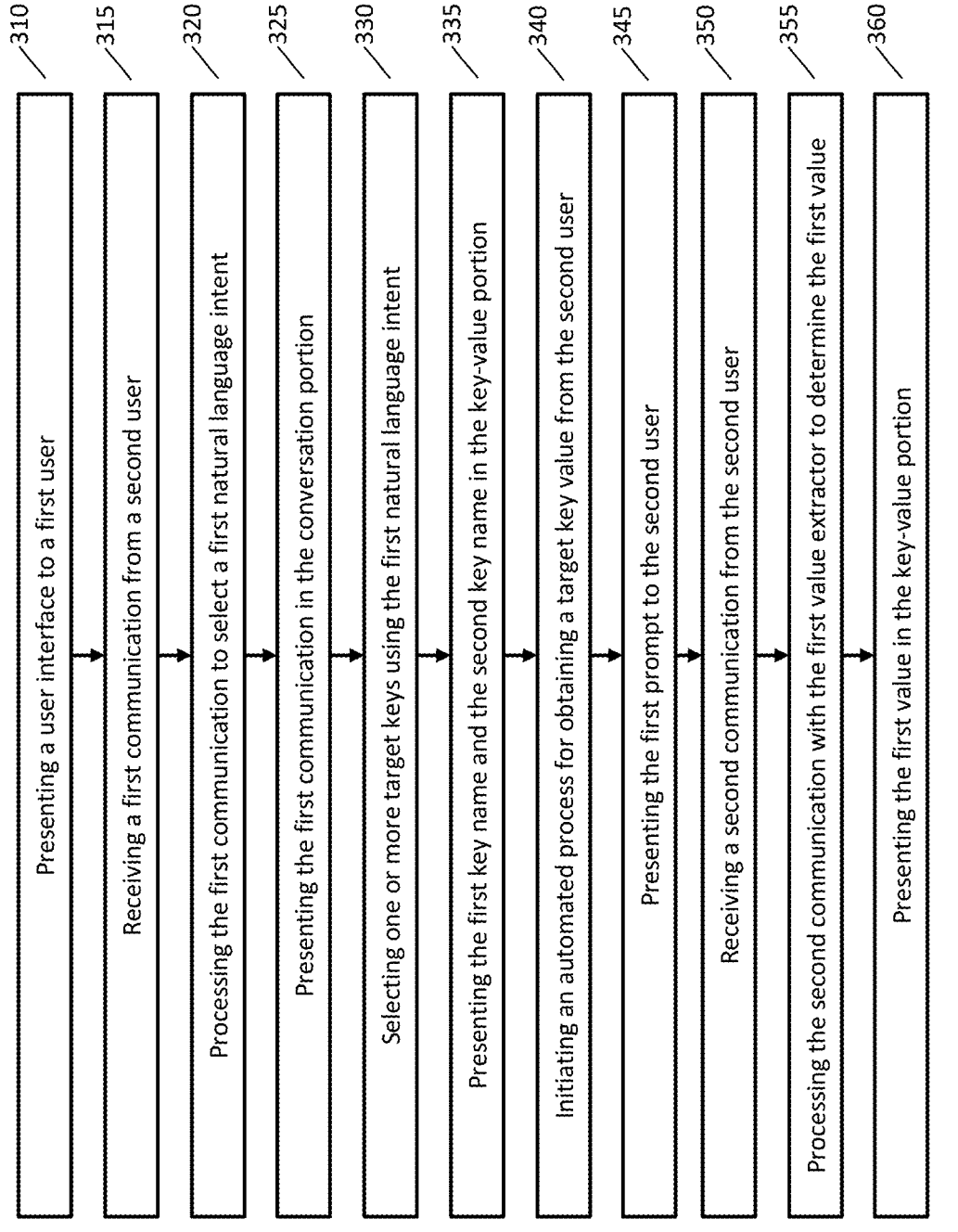

310 — Presenting a user interface to a first user

315 — Receiving a first communication from a second user

320 — Processing the first communication to select a first natural language intent 325 — Presenting the first communication in the conversation portion 330 — Selecting one or more target keys using the first natural language intent 335 — Presenting the first key name and the second key name in the key-value portion 340 — Initiating an automated process for obtaining a target key value from the second user 345 — Presenting the first prompt to the second user 350 — Receiving a second communication from the second user 355 — Processing the second communication with the first value extractor to determine the first value 360 — Presenting the first value in the key-value portion

Fig. 3

AUTOMATED KEY-VALUE EXTRACTION USING NATURAL LANGUAGE INTENTS

BACKGROUND

In a variety of situations, it may be desired to obtain information from conversations or communications. For example, in a text or speech conversation between two people, a first person may be obtaining information from a second person, such as information about the person (e.g., name, address, or phone number) or information about other things (e.g., a purchase or travel plans).

Manual efforts for a first person to obtain information from a second person in a conversation may be tedious and time consuming for the first person. Automated techniques to assist a first person in obtaining information from a second person in a conversation may increase the efficiency of the first person.

SUMMARY

In some aspects, the techniques described herein relate to a computer-implemented method for extracting values from text, including: presenting a user interface to a first user, wherein the user interface includes a key-value portion and a conversation portion; receiving a first communication from a second user; processing the first communication to select a first natural language intent; presenting the first communication in the conversation portion; selecting a plurality of target keys using the first natural language intent, wherein the plurality of target keys includes: a first target key corresponding to a first key name, a first prompt, and a first value extractor, and a second target key corresponding to a second key name, a second prompt, and a second value extractor; presenting the first key name and the second key name in the key-value portion; and initiating an automated process for obtaining, from the second user, a first value for the first target key and a second value for the second target key, wherein the automated process includes: presenting the first prompt to the second user, receiving a second communication from the second user, processing the second communication with the first value extractor to determine the first value, presenting the first value in the key-value portion, presenting the second prompt to the second user, receiving a third communication from the second user, and processing the third communication with the second value extractor.

In some aspects, the techniques described herein relate to a computer-implemented method, wherein the first natural language intent is selected from a set of available natural language intents and each natural language intent may be associated with one or more target keys.

In some aspects, the techniques described herein relate to a computer-implemented method, wherein the first value extractor uses a first extraction technique, the second value extractor uses a second extraction technique, and the first extraction technique is different from the second extraction technique.

In some aspects, the techniques described herein relate to a computer-implemented method, wherein the automated process includes: determining that the second value extractor was not able to determine the second value; and notifying the first user.

In some aspects, the techniques described herein relate to a computer-implemented method, including restarting the automated process after an action by the first user.

In some aspects, the techniques described herein relate to a computer-implemented method, including performing an operation on behalf of the second user using the first value and the second value.

In some aspects, the techniques described herein relate to a computer-implemented method, including: the plurality of target keys includes a third target key corresponding to a third key name; determining that a fourth communication from the second user includes a third value for the third target key; and presenting a third key name and the third value in the key-value portion.

In some aspects, the techniques described herein relate to a computer-implemented method, wherein the automated process is initiated automatically after selecting the plurality of target keys.

In some aspects, the techniques described herein relate to a system, including at least one server computer including at least one processor and at least one memory, the at least one server computer configured to: receive a first communication from a second user to a first user; process the first communication to select a first natural language intent; select a plurality of target keys using the first natural language intent, wherein the plurality of target keys includes: a first target key corresponding to a first key name, a first prompt, and a first value extractor, and a second target key corresponding to a second key name, a second prompt, and a second value extractor; provide the first prompt for presentation to the second user; receive a second communication from the second user; process the second communication with the first value extractor to determine a first value; provide the second prompt for presentation to the second user; receive a third communication from the second user; and process the third communication with the second value extractor.

In some aspects, the techniques described herein relate to a system, wherein the first value extractor uses a first extraction technique, the second value extractor uses a second extraction technique, and the first extraction technique is different from the second extraction technique.

In some aspects, the techniques described herein relate to a system, wherein the first value extractor uses a regular expression to determine the first value.

In some aspects, the techniques described herein relate to a system, wherein the first value extractor uses a dialogue state tracking to determine the first value.

In some aspects, the techniques described herein relate to a system, wherein the first value extractor uses a question-answering model to determine the first value.

In some aspects, the techniques described herein relate to a system, wherein the at least one server computer is configured to: present a first user interface to the first user; present a second user interface to the second user; and present the first value in the first user interface.

In some aspects, the techniques described herein relate to a system, wherein the first communication is received via an API call from a computer of a company to a computer of a third-party company.

In some aspects, the techniques described herein relate to a system, wherein processing the first communication to select a first natural language intent includes processing the first communication with a neural network classifier.

In some aspects, the techniques described herein relate to a system, wherein: the plurality of target keys includes a third target key corresponding to a third key name; and retrieving a third value from a datastore.

In some aspects, the techniques described herein relate to one or more non-transitory, computer-readable media including computer-executable instructions that, when executed, cause at least one processor to perform actions including: receiving a first communication from a second user to a first user; processing the first communication to select a first natural language intent; selecting a plurality of target keys using the first natural language intent, wherein the plurality of target keys includes: a first target key corresponding to a first key name, a first prompt, and a first value extractor, and a second target key corresponding to a second key name, a second prompt, and a second value extractor; providing the first prompt for presentation to the second user; receiving a second communication from the second user; processing the second communication with the first value extractor to determine a first value; providing the second prompt for presentation to the second user; receiving a third communication from the second user; and processing the third communication with the second value extractor.

In some aspects, the techniques described herein relate to one or more non-transitory, computer-readable media, wherein the second user is receiving customer support from a company.

In some aspects, the techniques described herein relate to one or more non-transitory, computer-readable media, wherein the first value extractor uses a first extraction technique, the second value extractor uses a second extraction technique, and the first extraction technique is different from the second extraction technique.

In some aspects, the techniques described herein relate to one or more non-transitory, computer-readable media, wherein the first communication is a text communication.

BRIEF DESCRIPTION OF THE FIGURES

The invention and the following detailed description of certain embodiments thereof may be understood by reference to the following figures:

FIG. 3 is a flowchart of an example method for extracting values from text.

DETAILED DESCRIPTION

Figure 1:
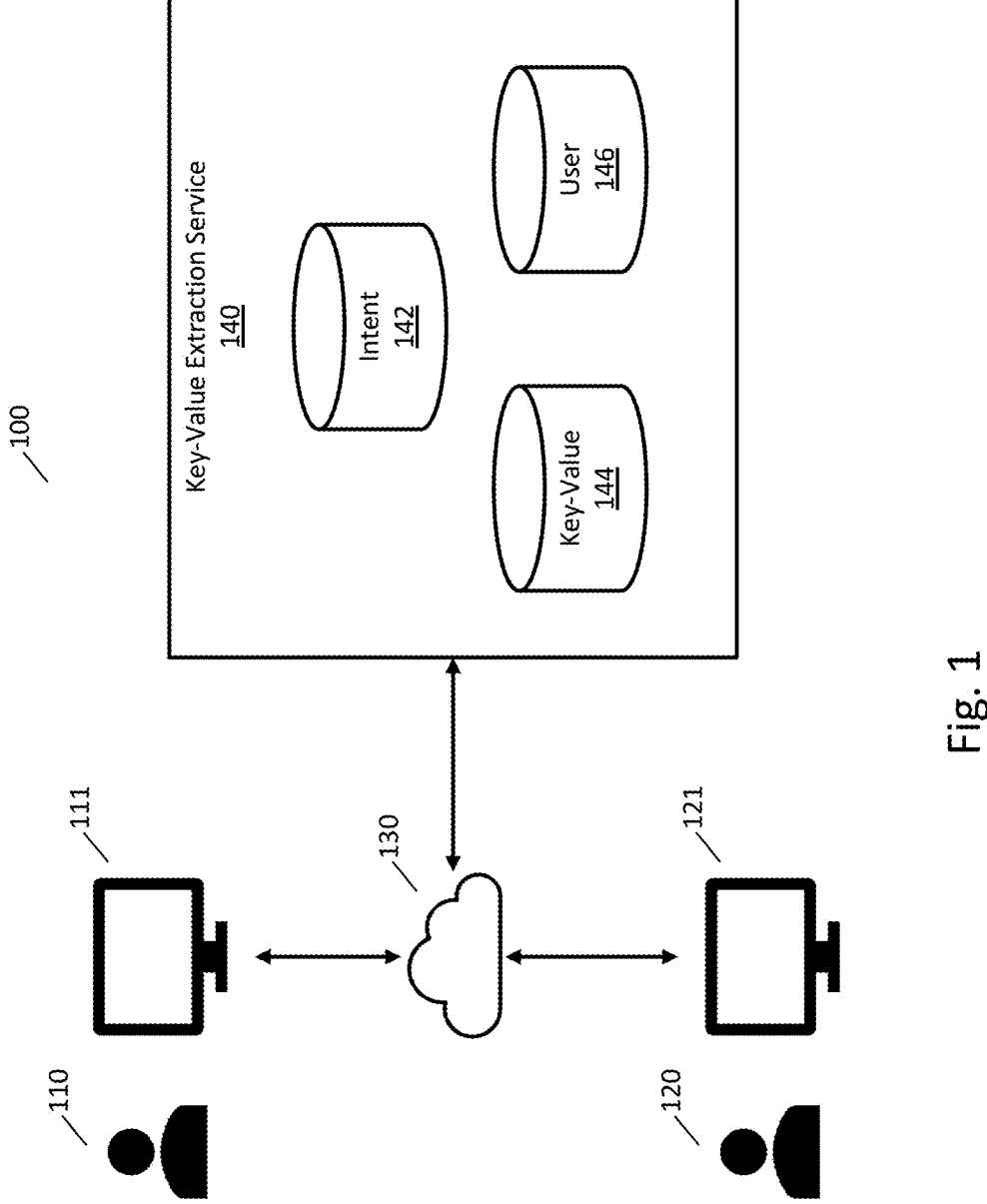
FIG. 1 is an example system for using a key-value extraction service to obtain values for keys from a conversation.

In a variety of conversations, a first person may be seeking to obtain information from a second person. For example, the first person may be a customer support agent assisting a customer with a recent purchase, and the agent may need to obtain information, such as the name and address of the customer or a transaction number of a purchase.

A fully manual process may be tedious and time consuming for the agent and expensive for the company that employs agent since they will need a greater number of agents to handle customer support requests. A fully automated process may provide a bad experience for customers when the automated process is not able to properly handle the specific needs of the customer.

To reduce the costs of providing support and, at the same time, providing personalized and high quality support to customers, the agent may be assisted or partial automation may be used for the communications between the agent and the customer. Portions of the conversation that are not amenable to automation (e.g., complicated or unexpected situations) may be handled by the agent. Portions of the conversation that may be automated with a high likelihood of success may be handled with automated techniques. Where the automated techniques do not provide expected results, the agent can step in to take over.

The techniques described herein may be used with any type of conversation or communications session, including, for example, any combination of text, speech, or video. For clarity of presentation, examples of text communications will be used below, but the same techniques may be used for speech or video conversations where speech is converted to text using automatic speech recognition, text is converted to speech using speech generation techniques, and/or pre-recorded speech segments are used.

One portion of a conversation that may be automated is the extraction of specific types of information. A key may represent a type of information to be extracted (e.g., a phone number) and a value may be extracted corresponding to the key (e.g., the actual phone number of a customer). A company providing customer support may have a database of keys corresponding to information that may be needed to obtain from customers. The company may create techniques for automating the process of obtaining this information from customers in a conversation.

A key may be associated with an identifier to facilitate storage and retrieval of information about the key (e.g., storage and retrieval from a database).

A key may be associated with a key name, such as "Phone Number". The key name may be presented to a user. Any appropriate key name may be used.

A key may be associated with a prompt to be used in a conversation to obtain a value for the key. For example, for a "Phone Number" key, the prompt may be "What is your phone number?" Use of the prompt may be automated so that it does not have to be manually provided.

A key may be associated with a value extractor to obtain a value for the key from a communication. One or more extraction techniques may be available, such as regular expressions, named entity recognition, dialogue state tracking, or a question-answering model. A value extractor may use a particular extraction technique (e.g., a regular expression) that is adapted to the type of information corresponding to a key (e.g., a regular expression to obtain a phone number). The value extractor may automate obtaining the value from a communication so that a user does not have to otherwise retrieve it (e.g., type it into a form).

The information needed to be extracted from a conversation may be different for different types of conversations. For example, the information needed to return a purchased item may be different from the information needed to purchase an airline ticket. In addition to automating the extraction of specific values from communications, the determination of the specific items of information that are needed from a user may also be automated.

The information items that are needed to be obtained from a conversation may be determined using any appropriate techniques. In some implementations, a natural language intent may be determined for one or more communications of a conversation, and the natural language intent may be used to identify the information items that need to be obtained.

A natural language intent may correspond to what a user is attempting to accomplish within a conversation. A list or set of possible intents may be created that correspond to the expected subject matters of conversations. For example, for customer support conversations, the possible intents may correspond to the products and services and operations of the company, such as intents corresponding to the following: pay bill, change address, cancel service, add service, etc.

To determine an intent of a conversation, a received communication may be processed with a mathematical model, such as an intent classifier or a neural network. The mathematical model may provide an output that indicates the intent of the communication from a set of possible intents or that indicates that the communication does not match any intent of the set of intents.

As used herein, a natural language intent describes a set of natural language requests that have similar meaning. A set of intents may be defined (such as hundreds, thousands, or more intents), and the intents may be defined using any appropriate techniques. For example, an intent may be defined by a mathematical model that processes communications to determine intents of the communications or by a corpus of training data that was used to create the mathematical model. Because a concept may be expressed using a wide variety of language, a single intent may correspond to large number of communications.

An intent may be assigned a label to make it easier for humans to understand the types of messages corresponding to the intent. For example, a "pay bill" intent may include messages that express a desire to pay a bill.

In some implementations, natural language intents may be associated with one or more keys that are likely needed to be obtained to accomplish the objective of the conversation. A key that is identified as being likely needed for a conversation may be referred to as a target key. For example, a "return item" intent may have target keys for one or more of the following: customer name, item identifier, and payment method identifier. For another example, a "purchase plane ticket" intent may have target keys for one or more of the following: departure city, departure date, arrival city, arrival date, customer name, and payment method.

After a natural language intent of a conversation has been determined, and target keys corresponding to the intent have been identified, the techniques described herein may be used to extract values for the target keys from the conversation.

FIG. 1 is an example system 100 for using a key-value extraction service to obtain values for keys from a conversation.

In FIG. 1, user 110 and user 120 may be having a conversation about any appropriate subject matter. For example, user 110 may be a customer of a company and user 120 may be a customer support agent for the company. The conversation may use any appropriate channels, such as any combination of text, voice, and/or video. User 110 and user 120 may use any appropriate devices for the conversation, such as a phone, smart phone, computer, or any other electronic device. User 110 may use device 111 and user 120 may use device 121. The conversation may be facilitated by network 130. Network 130 may be any appropriate network, such as any combination of cellular, Wi-Fi, Bluetooth, or the Internet.

Key-value extraction service 140 may be used to assist in obtaining values of keys from the conversation. Key-value extraction service 140 may implement any of the techniques described herein, including but not limited to determining a natural language intent of a communication or conversation, determining target keys for a conversation, and extracting values for target keys. Key-value extraction service 140 may include or have access to various data stores. For example, intent datastore 142 may include entries for natural language intents that may be present in conversations and also for target keys that may correspond to natural language intents. Key-value datastore 144 may include entries for keys whose values may be extracted from conversations, including information such as key names, prompts, and value extraction techniques. User datastore 146 may store information about users. User datastore 146 may be used to retrieve information about users or to store information about users that has been extracted from conversations.

Key-value extraction service 140 may be used for one user in a conversation to extract key values from another user in a conversation or may be used to assist more than one user in a conversation to extract key values from other users in the conversation. Key-value extraction service 140 may be used for any types of conversations and for any number of users. In some implementations, key-value extraction service 140 may be used to assist a customer support agent of a company to extract key values in a conversation with a customer of the company.

Figure 2A:
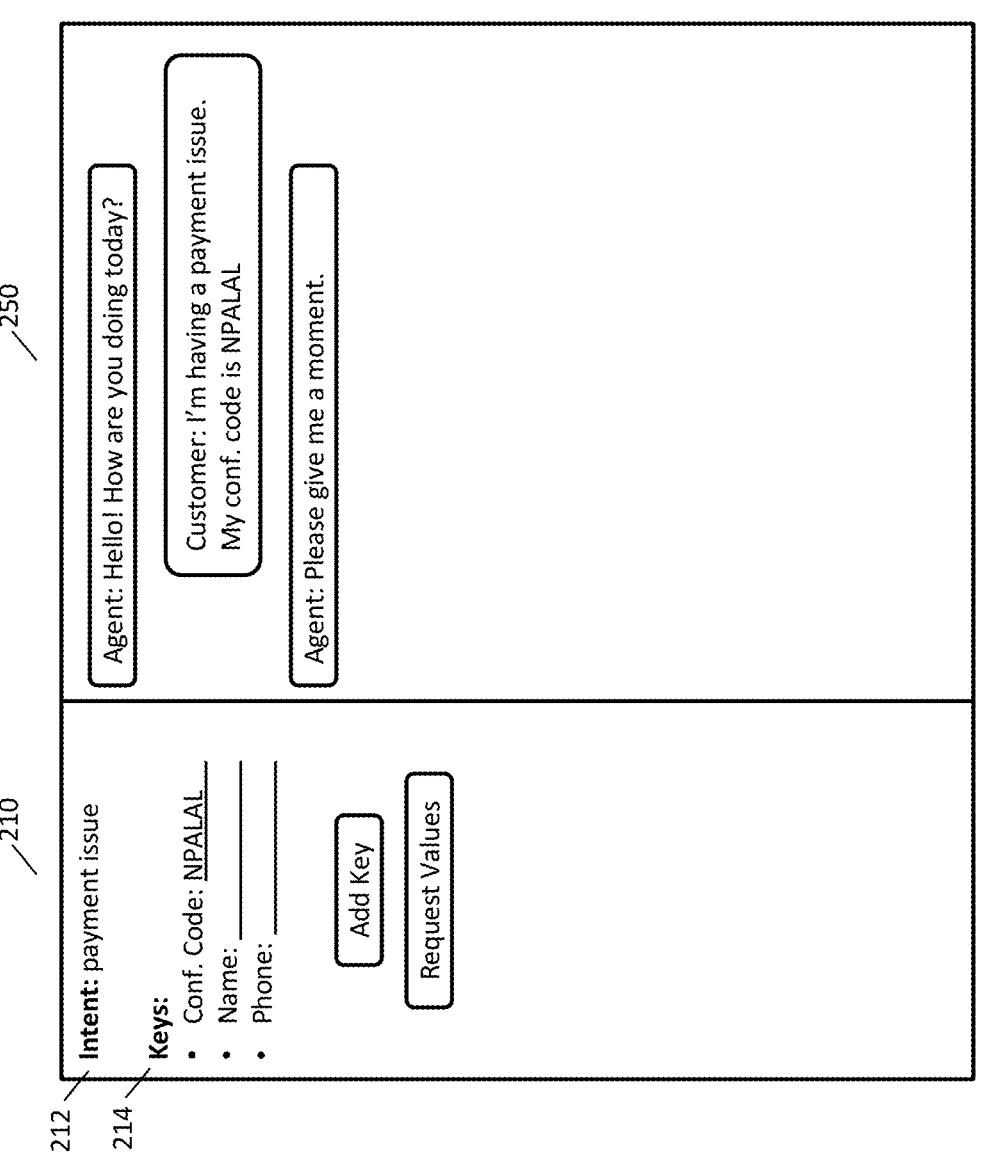
FIGS. 2A and 2B are example user interfaces for assisting a first user in extracting key values during a conversation with a second user.
Figure 2B:
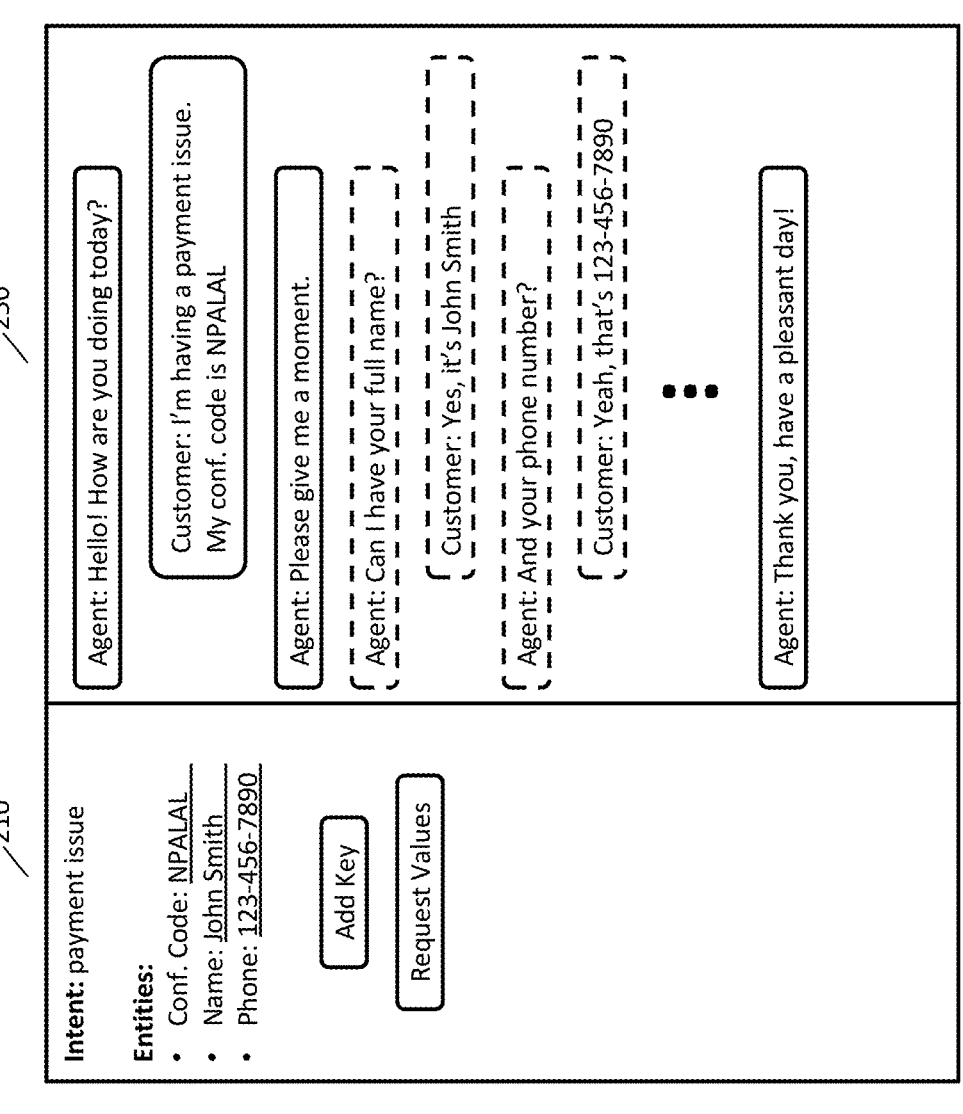

FIGS. 2A and 2B are example user interfaces for assisting a first user in extracting key values during a conversation with a second user. The user interfaces of FIGS. 2A and 2B are illustrative examples and any appropriate type of user interface may be used. In the example of FIGS. 2A and 2B, the first user is a customer support agent and the second user is a customer.

In FIG. 2A, user interface 200 has a key-value portion 210 and a conversation portion 250. Key-value portion 210 may present information, such as a natural language intent of the conversation, key values to be extracted from the conversation, or key values that have been extracted from the conversation. Conversation portion 250 may present communications between the users in the conversation.

In the example of FIG. 2A, three communications are shown in conversation portion 250. One or more of the messages have been processed to determine a natural language intent of the conversation. For example, the natural language intent may be that the customer is having an issue making a payment. The natural language intent may be automatically determined and presented to the first user in key-value portion 210, for example, as intent 212.

One or more target keys may also be identified for the conversation. The target keys may be presented to the first user, for example, as keys 214 to assist the first user in obtaining values for the target keys from the second user. Any appropriate techniques may be used to identify the target keys for the conversation.

In some implementations, the target keys may be determined using a natural language intent corresponding to the conversation. For example, a datastore of natural language intents may be available where the datastore stores target keys for different natural language intents. This datastore may be used to obtain target keys for the natural language intent that was determined from the conversation.

In the example of FIG. 2A, the natural language intent is a payment issue, and three target keys have been identified: confirmation code, name, and phone number. The kay names for these three target keys are shown in key-value portion 210. In some implementations, the first user may be able to add additional target keys. For example, key-value portion 210 may include an "Add Key" button to allow the first user to enter an additional target key to be extracted from the conversation.

In some instances, the second user may provide a key value before the target keys have been determined. In the example of FIG. 2A, the first communication from the second user includes the confirmation code. Where a user provides a value for a target key before being asked to provide it, the value may be automatically extracted from the communication and shown in key-value portion 210. The extraction of values is described in greater detail below.

The first user may then interact with the second user to obtain values for the two remaining target keys. Without any automated assistance, the second user may manually enter a communication requesting a value, wait the for the second user to respond, and then manually enter the received value in another location, such as a form. To assist the first user in obtaining values for the target keys, aspects of this process may be automated.

FIG. 2B illustrates a user interface for extracting values for target keys using an automated process. Following the process described above, key-value portion 210 shows target keys where values are needed from the second user. The automated processes described herein may be used to obtain values for the target keys. For example, key-value portion 210 may include a "Request Values" button to begin an automated process. The automated process may be performed, for example, for all target keys where values have not yet been obtained or for target keys selected by the first user (e.g., with a checkbox for each of the target keys). In FIG. 2B communications corresponding to an automated process to obtain values for target keys are shown with dashed lines.

When the automated process is initiated, a first target key may be selected. A prompt for the first target key may be obtained and sent in a communication to the second user. When the second user responds, the communication from the second user may be processed to extract a first value for the first target key using a first value extractor corresponding to the first target key. The first value may then be shown next to the first target key name in key-value portion 210. For example, in FIG. 2B, the prompt "Can I have your full name?" is an example prompt sent to the second user. The second user responds with "Yes, it's John Smith." The value extractor processes this communication to determine that the name is "John Smith" and shows the name in key-value portion 210.

In some instances, the first value extractor may not be able to extract the first value from the communication received from the second user. For example, the prompt may ask for a phone number, and the response from the second user may request clarification (e.g., "home or work phone number?") instead of providing the requested value. Where the first value extractor is not able to obtain the first value, an alert may be presented to the first user or the first user may otherwise be notified. The first user may then review the communication from the second user to determine the next communication to send to the second user. The first user may continue to be involved with obtaining values for the target keys or may cause the automated process to continue or be restarted after providing the clarification.

The above process may be continued with other target keys until values have been obtained for all of the needed target keys.

FIG. 3 is a flowchart of an example method for extracting values from text.

At step 310, a user interface is presented to a first user, wherein the user interface comprises a key-value portion and a conversation portion. The user interface may be configured to present one or more communications between the first user and a second user in the conversation portion. The user interface may be configured to present information in the key-value portion, such as a natural language intent of the conversation, key values to be extracted from the conversation, or key values that have been extracted from the conversation. The user interface may be presented using any appropriate device and any appropriate techniques. The user interface have a similar appearance to the user interface of FIG. 2A-B or a different appearance and portions may be omitted (e.g., key-value portion).

At step 315, a first communication is received from a second user. The communication may use any appropriate channel (e.g., any combination of text, voice, or video), may be received using any appropriate techniques (e.g., SMS, web app, etc.), and may relate to any appropriate subject matter (e.g., customer support from a company). For example, the second user may initiate a customer support session from a website of a company.

At step 320, the first communication is processed to select a first natural language intent corresponding to the communication. In some instances or implementations, more than one communication from the second user may be processed to determine the first natural language intent. For example, a first communication from the second user may be a greeting and a later communication from the second user may indicate the subject matter of the conversation. The first natural language intent may be selected from a set of possible or available natural language intents. For example, a set of natural language intents may be determined in advance corresponding to expected communications from users.

Any appropriate techniques may be used to determine the first natural language intent from the first communication. In some implementations, the first communication may be represented as a sequence of vectors in a vector space (e.g., a sequence of word embeddings, vector representations of tokens or sub-word tokens, or byte-pair encodings). The vector representation of the first communication may then be processed by a mathematical model to select the first natural language intent. For example, the mathematical model may be a classifier, such as a neural network classifier. In some implementations, the mathematical model may include a logistic regression classifier.

In some implementations, a name or other information about the first natural language intent may be presented in the user interface, such as in the key-value portion of the user interface.

At step 325, the first communication is presented in the conversation portion of the user interface. The first communication may be presented using any appropriate techniques, such as text with an indicator that the communication was received from the second user.

At step 330, one or more target keys are selected using the first natural language intent. The one or more target keys may include a first target key corresponding to a first key name, a first prompt, and a first value extractor. The one or more target keys may include a second target key corresponding to a second key name, a second prompt, and a second value extractor.

The one or more target keys may be selected using any appropriate techniques. In some implementations, the target keys may be determined by performing a lookup in a datastore using an identifier of the first natural language intent. The datastore may be configured using knowledge of the information that is likely needed for the possible natural language intents.

A key is a representation of a type of information. The key may correspond, for example, to information that is stored in a database entry or to information stored in a variable that is processed by a computer. A company may define a set of keys for information that is needed to be obtained from users. A value of a key is the information corresponding to a user (e.g., a customer of a company). For example, for a key for the phone number of a customer, the value for a first customer is actual phone number of the first customer and the value for a second customer is the actual phone number of the second customer.

A key name may include any appropriate information for presenting to a user the type of information corresponding to a key. For example, for a key for the phone number of a customer, the key name may be the string "Phone". For another example, for a key for the zip code of a customer, the key name may be "Zip".

The prompt may be any appropriate text to present to a user to request that the user provide the information corresponding to the key. For example, for a key for phone number, the prompt may be "What is your phone number?"

A value extractor is a technique to obtain a value corresponding to a key from one or more communications received from a user. Multiple types of value extractors may be available because different types of value extractors may be more accurate for certain types of keys. Different keys may use different value extraction techniques to improve performance. A value extractor may use any appropriate techniques to obtain a value from text, such as any of the following techniques: regular expressions, named entity recognition, dialogue state tracking, or a question-answering mathematical model.

A regular expression is a specification or a formula for searching for a pattern of characters in text. Any appropriate type of regular expression may be used. For example, a regular expression such as "(?\d{3}\)?[\s.-]\d{3}[\s.-]\d{4}" may be used to extract typical representations of 10-digit phone numbers from text.

Named entity recognition (NER) includes techniques for extracting information (sometimes referred to as "named entities") from text. In some implementations, NER techniques may classify tokens of text as not corresponding to any named entity or as corresponding one of set of categories of named entities (e.g., city, person, or organization). Sequence process techniques may be used to improve the accuracy of the token classifications or to combine sequences of words or tokens into a single entity (e.g., "New York City").

Dialogue state tracking (DST) refers to mathematical models that are trained to look for slot values in communications of a conversation. In some implementations, DST may be span based, classification based, or generation based. For example, a generation-based DST model may be implemented as a sequence-to-sequence model. The sequence input to a DST may include one or more of text of a conversation, a domain of the conversation, and an identifier of a slot whose value is to be extracted. The output of the DST may be tokens corresponding to the value. A generative DST may be implemented using any appropriate techniques, such as large-scale pretrained language models (e.g., text-to-text transformer or T5).

A question-answering mathematical model is a mathematical model that is able to extract an answer to a question by processing question text (text of a question) and answer text (text that contains the answer). In some implementations, a question-answering mathematical model may determine a start index into the answer text where the answer starts and an end index into the answer text where the answer ends. The answer is then the text between the start index and the end index. A question-answering mathematical model may be implemented using any appropriate mathematical model, such as a Bidirectional Encoder Representations from Transformers (BERT) language model.

At step 335, one or more key names may be presented to the first user to inform the first user that values for these key names may need to be collected from the second user. The one or more key names may be presented to the first user using any appropriate techniques. For example, a list of key names may be presented to the first user as illustrated in key-value portion 210 of FIG. 2B. In some implementations, key names may not be presented to the first user.

At step 340, an automated process is initiated for obtaining values for one or more target keys. The automated process may be initiated using any appropriate techniques. In some implementations, the first user may select one or more target keys or all of the presented target keys (e.g., using check boxes) and then click a button to start the automated process. In some implementations, the automated process may begin without an explicit action from the first user. For example, the automated process may be started after the first intent and/or target keys are selected. In some implementations, a conversation flow model may be used to determine when to start the automated process. The conversation flow model may be a mathematical model (e.g., a neural network) that is trained to determine an appropriate point in the conversation to start the automated process.

At step 345, a first prompt for the first target key may be presented to the second user. The first prompt may be presented to the second user using any appropriate techniques. In some implementations, a communication may be sent to the second user where the communication includes the first prompt.

At step 350, a second communication is received from the second user. The second communication may be received from the second user using any appropriate techniques, such as any of the techniques described herein.

At step 355, the second communication is processed with the first value extractor to determine the first value for the first target key. Any appropriate value extractor may be used, such as any of the value extractors described herein.

At step 360, the first value may be presented to the first user. The first value may be presented to the first user using any appropriate techniques. For example, the first value may be presented as illustrated in key-value portion 210 of FIG. 2B where the first value is presented adjacent to the first target key name. In some implementations, first value may not be presented to the first user.

Steps 345 to 360 may be repeated for additional target keys. For example, a second prompt for a second target key may be presented to the second user. A third communication may be received from the second user. The third communication may be processed with a second value extractor to determine a second value for a second target key. The second value may then be presented to the first user. Steps 345 to 360 may further be repeated until values have been obtained for all target keys.

After values have been obtained for the target keys, the values may be used for any appropriate purpose. For example, the first user may perform an operation on behalf of the second user using the values (e.g., assist with the return of a product or update an address). For another example, the values may automatically be entered into a form or stored in a database (such as a customer relationship management database).

In some implementations or instances, values may be determined from communications that were received from the second user prior to the initiation of the automated process for obtaining values for target keys. For example, as illustrated in FIG. 2A, the second user provided a confirmation code in the same communication that was used to determine the first intent so the value of the confirmation code target key was received before the first intent was determined, before the target keys were determined, and before the automated process was initiated. When the automated process is initiated, communications from the second user that were previously received may be processed to determine if those communications include values for any of the target keys.

In some implementations or instances, values for target keys may be obtained from sources other than communications from the second user. For example, values for target keys may be retrieved from a database, and a value extractor may be configured to perform a database lookup using information about the second user, such as an identifier of the second user.

In some implementations, a third-party company may provide services to one or more other companies to implement the techniques described herein. For example, the one or more companies may be using the techniques described herein to provide customer support for their customers. The third-party company may provide an application programming interface (API) and/or other services to assist the one or more companies in implementing the techniques described herein.

The third-party company may implement any appropriate portions of the techniques described herein. In some implementations, the third-party company may implement all or nearly all of the techniques described herein. For example, the third-party company may provide the user interfaces presented to users in conversations, may determine the natural language intent of a conversation, may determine target keys corresponding to a natural language intent, and may implement automated processes for obtaining values of target keys from users.

In some implementations, the third-party company may provide an API for performing text processing for a company, and the company may implement the user interfaces that are presented to users in the conversations. The company may submit API calls to the third-party company for performing text processing operations. For example, a first API call may determine a natural language intent using one or more communications of a conversation. A second API call may determine a list of target keys from a natural language intent. A third API call may obtain a prompt for a target key. A fourth API call may extract the value of a target key from a communication. Any appropriate API calls may be used and the above examples may be combined in fewer API calls or split into additional API calls.

In some implementations, a company may transmit each communication in a conversation to the third-party company. The transmission may also include a conversation identifier to allow the third-party company to simultaneously keep track of multiple conversations. The third-party company may respond with information about the most recent communication, the state of the conversation, and/or instructions for the company. The response may take any appropriate format such as a JSON response.

For example, after processing a greeting (e.g., "How may I help you today?"), the third-party company may not be able to determine any information and may return a response such as

```
{
    id: 123,
    intent: null,
    target_keys: [ ],
    instruction: 'manual'
}
```

The 'manual' instruction may indicate that a user to the conversation (e.g., a customer support agent) should determine the next communication to the other user.

After processing a communication that allows the third-party company to determine a natural language intent, the response of the third-party company may include the natural language intent and/or target keys corresponding to the intent:

```
{
    id: 123,
    intent: PAYMENT_ISSUE,
    target_keys: [
        {key_id: 1001, key_name: 'Conf.Code', prompt: 'What is your
        confirmation code?', value: 'NPALAL'},
        { key_id: 1002, key_name: 'Name', prompt: 'What is your name?',
        value: null},
        { key_id: 1003, key_name: 'Phone', prompt: 'What is your phone
        number?', value: null }
    ],
    instruction: 'automate'
}
```

As described above and illustrated in FIG. 2A, the third-party company may process previously received communications to determine values for any of the target keys. Because target keys have been identified, the instruction may be for the company to initiate an automated process for obtaining values for the target keys. In some implementations, the response of the third-party company may also include a name and/or identifier of the value extractor to be used to obtain a value for each target key.

For subsequent communications received from a company, the third-party company may use a value extractor for one or more of the target keys to attempt to extract a value from a communication. For example, the third-party company may use value extractors for all target keys (in case additional information is provided about a target key that already has a value) or may use the value extractors only for the target keys where a value has not yet been obtained.

After processing a communication that contains the name of a user, the third-party company may include the value for the name in the response. After processing a communication that contains the phone number of the user, the third-party company may return the value for the phone number in the response. When values have been obtained for each of the target keys, the third-party company may return an instruction that indicates that the automated processing is complete.

In some instances, third-party company may not be able to extract a value from a communication. For example, for the prompt "What is your phone number?" the user may respond "Home or work?" In this situation, the third-party company may respond with an instruction (e.g., instruction: 'clarify') to indicate that automation should pause so that a user can provide clarification.

Figure 4:
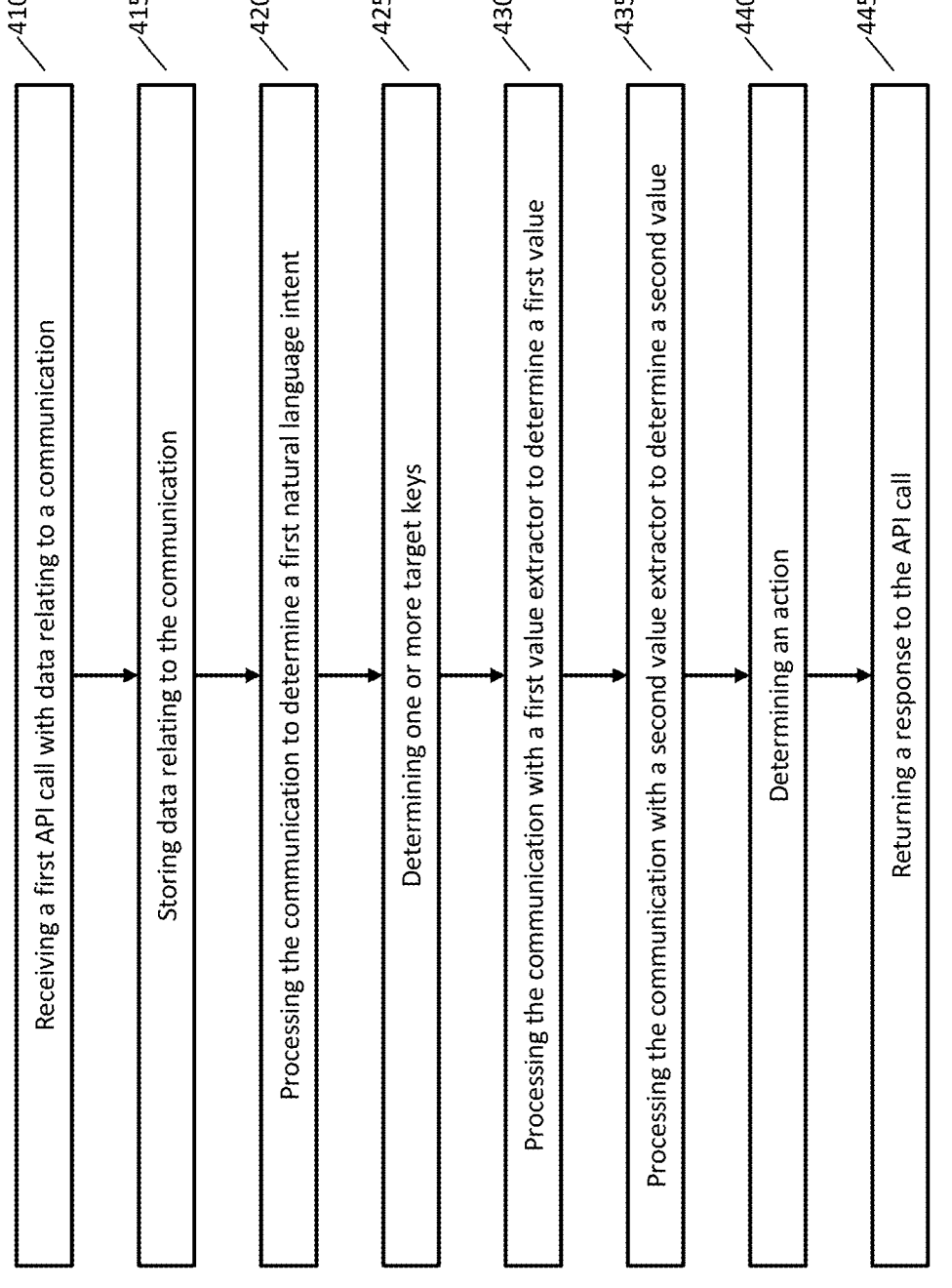
FIG. 4 is a flowchart of an example method for providing an API for extracting values from text.

FIG. 4 is a flowchart of an example method for providing an API for extracting values from text.

At step 410, a first API call is transmitted by a first company and received by a second company (e.g., a third-party company). The API call use any appropriate techniques, such as a REST API call with data in a JSON format. Any appropriate data may be received, such as any of the following: text of a communication, a conversation identifier (e.g., a unique identifier of the conversation so that different API calls can determine that different communications correspond to the same conversation), authentication credentials, and/or identifiers/indicators of a sender of the communication, a recipient of the communication, or the first company.

At step 415, information relating to the API call may be stored by the second company. For example, data transmitted in the API call may be stored in a database so that it may be retrieved using an identifier, such as a conversation identifier. In some implementations, step 415 may not be performed. For security or privacy reasons, the second company may process the data of the API and return an API response (as described herein), but may not store data of the API call.

At step 420, the text of the communication may be processed to determine a natural language intent using any of the techniques described herein. In some implementations, information about the intent may be stored by the second company. In some instances, step 420 may not be performed, such as where a natural language intent has been previously determined for the same conversation (e.g., as indicated by a conversation identifier).

At step 425, one or more target keys may be determined using a natural language intent. The target keys may be determined using any of the techniques described herein. The one or more target keys may include a first target key corresponding to a first key name, a first prompt, and a first value extractor. The one or more target keys may include a second target key corresponding to a second key name, a second prompt, and a second value extractor. In some instances, step 420 may not be performed, such as where one or more target keys have previously been determined.

At step 430, the text is processed by the first value extractor to determine a first value for the first target key using any of the techniques described herein. In some instances, step 430 may not be performed, such as where a first value for the first target key has previously been determined.

At step 435, the text is processed by the second value extractor to determine a second value for the second target key using any of the techniques described herein. In some instances, step 430 may not be performed, such as where a second value for the second target key has previously been determined.

Actions similar to steps 430 and 435 may be performed for any number of target keys. In some instances, the text may not include a value corresponding to a target key and a value extractor may not return a value.

At step 440, an instruction or action for the first company may be determined. Any appropriate set of instructions may be used, such as any of the instructions described herein. For example, a "manual" instruction may indicate that the first company should continue a conversation manually by a person instead of using automated techniques (e.g., because an intent and/or target keys have not yet been determined). An "automate" instruction may indicate that a conversation may be automated to determine values of target keys using provided prompts.

At step 445, a response to the first API call is returned by the second company to the first company. Any appropriate data may be returned, such as any of the following: text of a communication, a conversation identifier, an intent corresponding to the conversation, information about one or more target keys (e.g., key identifier, key name, prompt, value, and/or value extraction technique), and/or an instruction.

The steps of FIG. 4 may be performed for any number of communications in a conversation. For example, the first company may transmit text of some or all communications of a conversation to the second company using the API of the second company.

Figure 5:
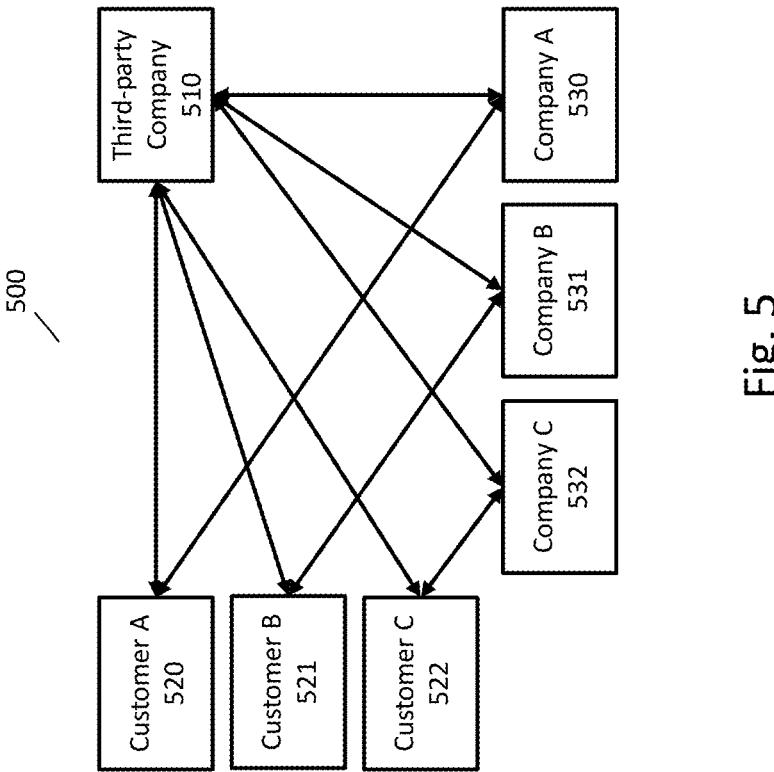
FIG. 5 illustrates a system that allows a third-party company to provide services to multiple companies.

FIG. 5 illustrates a system 500 that allows third-party company 510 to provide services to multiple companies. In FIG. 5, third-party company 510 is providing services to company A 530, company B 531, and company C 532. Third-party company 510 may provide services to any number of companies.

Customers of each company may communicate with a company where the support process uses the services of third-party company 510. For example, customer A 520 may be seeking support from company A 530, customer B 521 may be seeking support from company B 531, and customer C 522 may be seeking support from company C 532. It may or may not be apparent to the customers whether services of third-party company 510 are being used.

Third-party company 510 may assist a company in a variety of ways. In some implementations, third-party company 510 may provide a user interface to a customer to allow the customer to obtain customer support and/or provide a user interface to a customer support representative working on behalf of the company to respond to the customer. The third-party company may also perform other operations, such as any of the operations described herein. In some implementations, the company may provide the user interface presented to the customer and/or the customer support representative, and third-party company may assist the company by providing other operations described herein (e.g., by providing an API to the company).

The network communications between third-party company 510, customers, and companies may be architected in a variety of ways. In some implementations, all communications between a customer and a company may be via third-party company 510 and there may not be any direct connection between the customer and the company. In some implementations, third-party company 510 may communicate with the company but may not communicate directly with the customer. In some implementations, a customer may communicate directly with the company and also third-party company 510.

Where a customer is connected to both a company and third-party company 510, each of the two connections may be used for different kinds of requests. For example, where the customer is interacting with the company in a way that does not require the services of third-party company 510 (e.g., navigating a web site of the company), the customer may use the network connection with the company. Where the customer is interacting with the company in a way that uses the services of third-party company 510, the customer may use the network connection with third-party company. It may not be apparent to the customer whether the customer is using a network connection with the company or with third-party company 510.

Figure 6:
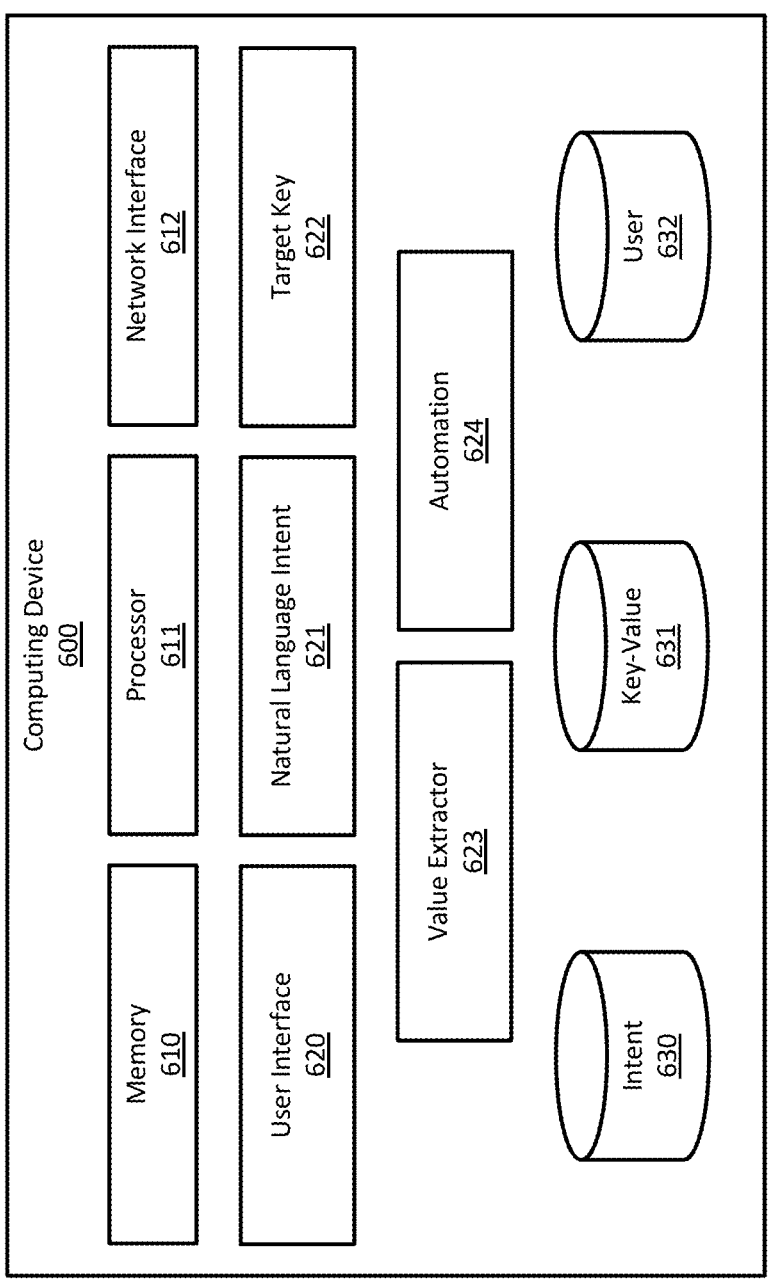
FIG. 6 illustrates components of one implementation of a computing device for implementing any of the techniques described herein.

FIG. 6 illustrates components of one implementation of a computing device 600 for implementing any of the techniques described herein. In FIG. 6, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 600 may include any components typical of a computing device, such as volatile or nonvolatile memory 610, one or more processors 611, and one or more network interfaces 612. Computing device 600 may also include any input and output components, such as displays, keyboards, and touch screens. Computing device 600 may also include a variety of components or modules providing specific functionality, and these components or modules may be implemented in software, hardware, or a combination thereof. Computing device 600 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 600 may have a user interface component 620 that may present a user interface to a user in a communication any may present information about a natural language intent and/or target keys using any of the techniques described herein. Computing device 600 may have a natural language intent component 621 that may determine a natural language intent from one or more communications using any of the techniques described herein. Computing device 600 may have a target key component 622 that may determine target keys for a conversation using any of the techniques described herein. Computing device 600 may have a value extractor component 623 that may extract a value from one or more communications using any of the techniques described herein. Computing device 600 may have an automation component 624 that may obtain values of target keys from a user using any of the techniques described herein.

Computing device 600 may include or have access to various data stores. Data stores may use any known storage technology such as files, relational databases, non-relational databases, or any non-transitory computer-readable media. Computing device 600 may have intent data store 630 that stores information about natural language intents that may be present in conversations. Computing device 600 may have a key-value data store 631 that stores information about keys that may be used to extract values from a conversation. Computing device 600 may have a user data store 632 that stores information about users participating in conversations.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method for extracting values from text, comprising:
   presenting a user interface to a first user, wherein the user interface comprises a key-value portion and a conversation portion;
   receiving a first communication of a conversation from a second user;

processing the first communication to select a first natural language intent;
   presenting the first communication in the conversation portion;
   selecting a plurality of target keys using the first natural language intent, wherein the plurality of target keys correspond to key values to be extracted from the conversation, and wherein the plurality of target keys includes:
      a first target key corresponding to a first key name, a first prompt, and a first value extractor, and
      a second target key corresponding to a second key name, a second prompt, and a second value extractor;
   presenting the first key name and the second key name in the key-value portion;
   initiating an automated process for obtaining, from the second user, a first value for the first target key using the first value extractor and a second value for the second target key using the second value extractor; and
   presenting on the user interface an interface element configured to enter, by the first user, an additional target key to be extracted from the conversation.

2. The computer-implemented method of claim 1, wherein the automated process comprises:
   presenting the first prompt to the second user,
   receiving a second communication from the second user,
   processing the second communication with the first value extractor to determine the first value,
   presenting the first value in the key-value portion,
   presenting the second prompt to the second user,
   receiving a third communication from the second user, and
   processing the third communication with the second value extractor.

3. The computer-implemented method of claim 1, wherein the first natural language intent is selected from a set of available natural language intents and each natural language intent may be associated with one or more target keys.

4. The computer-implemented method of claim 1, wherein the first value extractor uses a first extraction technique, the second value extractor uses a second extraction technique, and the first extraction technique is different from the second extraction technique.

5. The computer-implemented method of claim 2, wherein the automated process includes:
   determining that the second value extractor was not able to determine the second value; and
   notifying the first user.

6. The computer-implemented method of claim 2, comprising restarting the automated process after an action by the first user.

7. The computer-implemented method of claim 2, comprising performing an operation on behalf of the second user using the first value and the second value.

8. The computer-implemented method of claim 2, wherein the plurality of target keys includes a third target key corresponding to a third key name, and
   wherein the automated process includes:
      determining that a fourth communication from the second user includes a third value for the third target key, and
      presenting the third key name and the third value in the key-value portion.

9. The computer-implemented method of claim 1, wherein the automated process is initiated automatically after selecting the plurality of target keys.

10. A system, comprising at least one server computer comprising at least one processor and at least one memory, the at least one server computer configured to:

receive a first communication of a conversation from a second user to a first user;

process the first communication to select a first natural language intent;

select a plurality of target keys using the first natural language intent, wherein the plurality of target keys correspond to key values to be extracted from the conversation, and wherein the plurality of target keys includes:

a first target key corresponding to a first key name, a first prompt, and a first value extractor, and a second target key corresponding to a second key name, a second prompt, and a second value extractor; and present to the first user an interface element for entering an additional target key to be extracted from the conversation.

11. The system of claim 10, wherein the at least one server computer is configured to:

provide the first prompt for presentation to the second user;

receive a second communication of the second user;

process the second communication with the first value extractor to determine a first value;

provide the second prompt for presentation to the second user;

receive a third communication of the second user; and process the third communication with the second value extractor.

12. The system of claim 10, wherein the first value extractor uses a first extraction technique, the second value extractor uses a second extraction technique, and the first extraction technique is different from the second extraction technique.

13. The system of claim 10, wherein the first value extractor uses a regular expression to determine a first value.

14. The system of claim 10, wherein the first value extractor uses a dialogue state tracking to determine a first value.

15. The system of claim 10, wherein the first value extractor uses a question-answering model to determine a first value.

16. The system of claim 11, wherein the at least one server computer is configured to:

present a first user interface to the first user;

present a second user interface to the second user; and present the first value in the first user interface.

17. The system of claim 10, wherein the first communication is received via an API call from a computer of a company to a computer of a third-party company.

18. The system of claim 10, wherein processing the first communication to select a first natural language intent comprises processing the first communication with a neural network classifier.

19. The system of claim 10, wherein:

the plurality of target keys includes a third target key corresponding to a third key name; and retrieving a third value from a datastore.

20. One or more non-transitory, computer-readable media comprising computer-executable instructions that, when executed, cause at least one processor to perform actions comprising:

receiving a first communication of a conversation from a second user to a first user;

processing the first communication to select a first natural language intent;

selecting a plurality of target keys using the first natural language intent, wherein the plurality of target keys correspond to key values to be extracted from the conversation, and wherein the plurality of target keys includes:

a first target key corresponding to a first key name, a first prompt, and a first value extractor, and a second target key corresponding to a second key name, a second prompt, and a second value extractor;

providing the first prompt for presentation to the second user;

receiving a second communication of the second user;

processing the second communication with the first value extractor to determine a first value;

providing the second prompt for presentation to the second user;

receiving a third communication of the second user;

processing the third communication with the second value extractor; and presenting to the first user an interface element for entering an additional target key to be extracted from the conversation.

21. The one or more non-transitory, computer-readable media of claim 20, wherein the second user is receiving customer support from a company.

22. The one or more non-transitory, computer-readable media of claim 20, wherein the first value extractor uses a first extraction technique, the second value extractor uses a second extraction technique, and the first extraction technique is different from the second extraction technique.

23. The one or more non-transitory, computer-readable media of claim 20, wherein the first communication is a text communication.

* * * * *